May 26, 1925.
J. BUCHLI
1,539,010
DRIVING GEAR FOR VEHICLES
Filed April 17, 1924
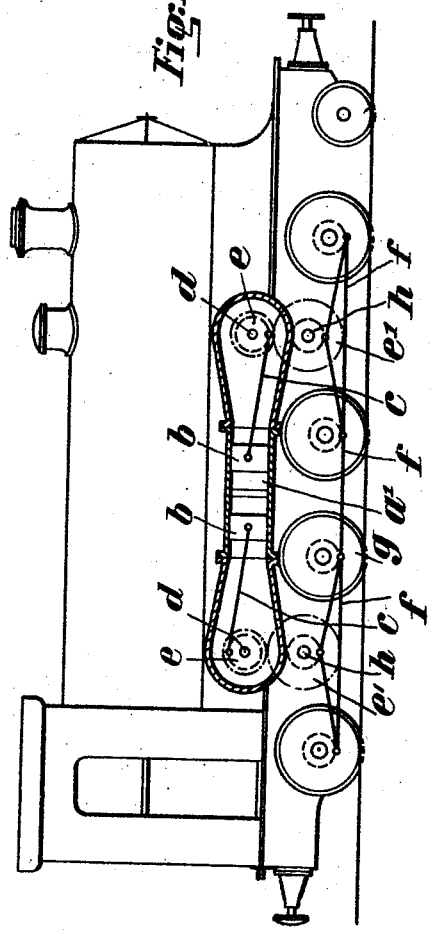
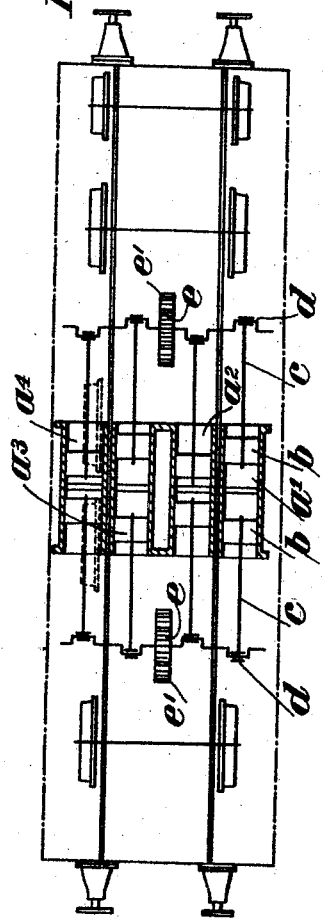

Patented May 26, 1925.

1,539,010

UNITED STATES PATENT OFFICE.

JACOB BUCHLI, OF BADEN, SWITZERLAND.

DRIVING GEAR FOR VEHICLES.

Application filed April 17, 1924. Serial No. 707,223.

*To all whom it may concern:*

Be it known that I, JACOB BUCHLI, a citizen of Switzerland, residing at Baden, Switzerland, Felsenstrasse, have invented certain new and useful Improvements in a Driving Gear for Vehicles, of which the following is a specification.

This invention relates to a new arrangement of the driving gear for vehicles. It allows of the construction of the vehicle being considerably simplified and the weight being reduced, the power of the engine driving the vehicle being at the same time fully utilized.

The essential novelty of this invention consists in a driving gear with opposed pistons in common cylinders and so arranged that the piston pressures act symmetrically to the centres of the cylinders through toothed wheels and driving rods and thereby on the driving wheels, and that the toothed wheels fitted on the crank shafts mesh with corresponding toothed wheels fitted on two shafts arranged at both ends of the cylinders, these shafts being connected to each other and to the driving wheels of the vehicle by means of coupling rods.

A locomotive with a driving gear according to this invention is shown diagrammatically in the drawing.

Fig. 1 is a side elevation, Fig. 2 a plan.

Four cylinders $a_1$, $a_2$, $a_3$, and $a_4$ are arranged alongside each other, and in each of them are two opposed pistons $b$, which work by means of connecting rods $c$, on the cranks of two shafts $d$ arranged at both ends of the cylinders. On these shafts toothed wheels $e$ are fitted, which in the example shown mesh with corresponding toothed wheels $e'$ fitted on two idle shafts $h$ arranged at both ends of the cylinders. These idle shafts are connected to each other and to the driving wheels of the locomotive by means of coupling rods $f$.

I claim:

In a driving gear for vehicles, opposed pistons in common cylinders, the piston pressures of which act symmetrically to the centres of the cylinders through toothed wheels and connecting rods, the toothed wheels fitted on the crankshafts meshing with corresponding toothed wheels fitted on idle shafts at both ends of the cylinders, these shafts being connected to each other and to the driving wheels of the vehicle by means of coupling rods.

In testimony whereof I have affixed my signature in presence of two witnesses.

JACOB BUCHLI.

Witnesses:
 L. LUBER,
 AUG. BUEGG.